(12) United States Patent
Cypher et al.

(10) Patent No.: US 7,032,078 B2
(45) Date of Patent: Apr. 18, 2006

(54) SHARED MEMORY MULTIPROCESSING SYSTEM EMPLOYING MIXED BROADCAST SNOOPING AND DIRECTORY BASED COHERENCY PROTOCOLS

(75) Inventors: Robert Cypher, Saratoga, CA (US); Ashok Singhal, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 377 days.

(21) Appl. No.: 10/136,619

(22) Filed: May 1, 2002

(65) Prior Publication Data

US 2003/0018739 A1    Jan. 23, 2003

(30) Foreign Application Priority Data

May 1, 2001    (EP)    ................ 01303988

(51) Int. Cl.
*G06F 12/12* (2006.01)

(52) U.S. Cl. .............. 711/141; 711/134; 711/119; 711/124; 711/146; 711/211; 709/230; 709/232; 709/235; 709/244

(58) Field of Classification Search ............... 711/141; 709/213; 707/201
See application file for complete search history.

(56) References Cited

U.S. PATENT DOCUMENTS

| | | | |
|---|---|---|---|
| 5,761,721 A | | 6/1998 | Baldus et al. |
| 5,802,582 A | | 9/1998 | Ekanadham et al. |
| 5,864,671 A | * | 1/1999 | Hagersten et al. ......... 709/213 |
| 5,887,138 A | * | 3/1999 | Hagersten et al. ......... 709/215 |
| 5,966,729 A | * | 10/1999 | Phelps ...................... 711/146 |
| 6,088,768 A | | 7/2000 | Baldus et al. |
| 6,209,064 B1 | | 3/2001 | Weber |
| 6,810,467 B1 | * | 10/2004 | Khare et al. ................ 711/146 |
| 2002/0133674 A1 | * | 9/2002 | Martin et al. ............... 711/141 |
| 2004/0117561 A1 | * | 6/2004 | Quach et al. ............... 711/146 |

(Continued)

FOREIGN PATENT DOCUMENTS

EP    0 489 583 A2    12/1991

(Continued)

OTHER PUBLICATIONS

The Microsoft Computer Dictionary, 5th edition, 2002 Microsoft Press, p. 362.*

(Continued)

*Primary Examiner*—Donald Sparks
*Assistant Examiner*—Jesse Diller
(74) *Attorney, Agent, or Firm*—Meyertons Hood Kivlin Kowert & Goetzel, P.C.; B. Noël Kivlin; Rory D. Rankin

(57) ABSTRACT

A multiprocessor computer system to selectively transmit address transactions using a broadcast mode or a point-to-point mode. Either a directory-based coherency protocol or a broadcast snooping coherency protocol is implemented to maintain coherency. A node is formed by a group of clients which share a common address and data network. The address network determines whether a transaction is conveyed in broadcast mode or point-to-point mode. The address network includes a table with entries which indicate transmission modes corresponding to different regions of the address space within the node. Upon receiving a coherence request transaction, the address network may access the table to determine the transmission mode which corresponds to the received transaction. Network congestion may be monitored and transmission modes adjusted accordingly. When network utilization is high, the number of transactions which are broadcast may be reduced. Alternatively, when network utilization is low, the number of broadcasts may be increased.

21 Claims, 10 Drawing Sheets

U.S. PATENT DOCUMENTS

2005/0053057 A1* 3/2005 Deneroff et al. ............ 370/360

FOREIGN PATENT DOCUMENTS

EP            0 817 069 A1    6/1997
EP               817069 A1 *   1/1998

OTHER PUBLICATIONS

Technical Disclosure Bulletin, "Broadcast of Mostly-Read-Only Highly Shared Cache Lines in Multiprocesso Systems", May 1987.

International Search Report Application #01303988.8-2212, Mailed Nov. 27, 2001.

"Specifying and Verifying a Broadcast and a Multicast Snooping Cache Coherence Protocol", Sorin, et al, *IEEE Transactions on Parallel and Distributed Systems*, vol. 13, No. 6, Jun. 2002, http://www.cs.wisc.edu/multifacet/papers/tpds02_lamport.pdf.

"Multicast Snooping: A New Coherence Method Using a Multicast Address Network", Bilir, et al, *The 26th International Symposium on Computer Architecture*, IEEE, Atlanta, GA, May 2-4, 1999, http://csdl.computer.org/comp/proceedings/isca/1999/0170/00/01700294abs.htm.

"Architecture and Design of AlphaServer GS320", Gharachorloo, et al, *ACM Sigplan Notices*, vol. 35, Issue 11, Nov. 2000, http://portal.acm.org/citation.cfm?id=356991&dl=ACM&coll=portal.

"View Caching: Efficient Software Shared Memory for Dynamic Computations", Karamcheti, et al, *11th International Parallel Processing Symposium*, Geneva, Switzerland, Apr. 1-5, 1997, http://ipdps.eece.unm.edu/1997/s13/318.pdf.

"Cache-Coherent Distributed Shared Memory: Perspectives on Its Development and Future Challenges", Hennessy, et al, *Proceedings of the IEEE*, vol. 87, Issue 3, Mar. 1999, ISSN 0018-9219, http://cva.stanford.edu/cs99s/papers/hennessy-cc.pdf.

"Survey on Cache Coherence in Shared & Distributed Memory Multiprocessors", Garg, et al, Online, http://www.cse.psu.edu/~cg530/proj03/cache_coherence.pdf.

"A Survey of Cache Coherence Mechanisms in Shared Memory Multiprocessors", Lawrence, Department of Computer Science, University of Manitoba, Manitoba, Canada, May 14, 1998, http://www.cs.uiowa.edu/~rlawrenc/research/Papers/cc.pdf.

"Bandwidth Adaptive Snooping", Martin, et al. *8th Annual International Symposium on High-Performance Computer Architecture (HPCA-8)*, Cambridge, MA, Feb. 2-6, 2002.

"Timestamp Snooping: An Approach for Extending SMPs", Martin, et al., *9th International Conference on Architectural Support for Programming Languages and Operating Systems (ASPLOS-IX)*, Cambridge, MA, Nov. 13-15, 2000.

* cited by examiner

| Address 602 | Client 1 604 | Client 2 606 | Client 3 608 | Client 4 610 | Client 5 612 | Owner 614 |
|---|---|---|---|---|---|---|
| Aa | — | — | M | — | — | Client 3 |
| Ab | — | — | M | — | — | Client 3 |
| Ac | M | — | M | — | — | Client 3 |
| Ad | S | — | S | S | — | Client 1 |
| Ae | S | — | S | S | — | None |
| Af | — | — | O | — | — | Client 3 |
| Ag | — | — | — | M | — | Client 4 |
| ... | ... | ... | ... | ... | ... | ... |

Fig. 4

SHARED MEMORY MULTIPROCESSING SYSTEM EMPLOYING MIXED BROADCAST SNOOPING AND DIRECTORY BASED COHERENCY PROTOCOLS

BACKGROUND OF THE INVENTION

1. Field of the Invention

This invention relates to the field of multiprocessor computer systems and, more particularly, to coherency protocols employed within multiprocessor computer systems having shared memory architectures.

2. Description of the Related Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole.

A popular architecture in commercial multiprocessing computer systems is a shared memory architecture in which multiple processors share a common memory. In shared memory multiprocessing systems, a cache hierarchy is typically implemented between the processors and the shared memory. In order to maintain the shared memory model, in which a particular address stores exactly one data value at any given time, shared memory multiprocessing systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory.

Shared memory multiprocessing systems generally employ either a broadcast snooping cache coherency protocol or a directory based cache coherency protocol. In a system employing a snooping broadcast protocol (referred to herein as a "broadcast" protocol), coherence requests are broadcast to all processors (or cache subsystems) and memory through a totally ordered network. By delivering coherence requests in a total order, correct coherence protocol behavior is maintained since all processors and memories observe requests in the same order. When a subsystem having a shared copy of data observes a coherence request for exclusive access to the block, its copy is typically invalidated. Likewise, when a subsystem that currently owns a block of data observes a coherence request to that block, the owning subsystem typically responds by providing the data to the requestor and invalidating its copy, if necessary.

In contrast, systems employing directory based protocols maintain a directory containing information indicating the existence of cached copies of data. Rather than unconditionally broadcasting coherence requests, a coherence request is typically conveyed through a point-to-point network to the directory and, depending upon the information contained in the directory, subsequent transactions are sent to those subsystems that may contain cached copies of the data in order to cause specific coherency actions. For example, the directory may contain information indicating that various subsystems contain shared copies of the data. In response to a coherency request for exclusive access to a block, invalidation transactions may be conveyed to the sharing subsystems. The directory may also contain information indicating subsystems that currently own particular blocks of data. Accordingly, responses to coherency requests may additionally include transactions that cause an owning subsystem to convey data to a requesting subsystem. In some directory based coherency protocols, specifically sequenced invalidation and/or acknowledgment messages are required. Numerous variations of directory based cache coherency protocols are well known.

In certain situations or configurations, systems employing broadcast protocols may attain higher performance than comparable systems employing directory based protocols since coherence requests may be provided directly to all processors unconditionally without the indirection associated with directory protocols and without the overhead of sequencing invalidation and/or acknowledgment messages. However, since each coherence request must be broadcast to all other processors, the bandwidth associated with the network that interconnects the processors in a system employing a broadcast snooping protocol can quickly become a limiting factor in performance, particularly for systems that employ large numbers of processors or when a large number of coherence requests are transmitted during a short period. In such environments, systems employing directory protocols may attain overall higher performance due to lessened network traffic and the avoidance of network bandwidth bottlenecks.

Thus, while the choice of whether to implement a shared memory multiprocessing system using a broadcast snooping protocol or a directory based protocol may be clear based upon certain assumptions regarding network traffic and bandwidth, these assumptions can often change based upon the utilization of the machine. This is particularly true in scalable systems in which the overall numbers of processors connected to the network can vary significantly depending upon the configuration.

SUMMARY OF THE INVENTION

The problems outlined above may in large part be solved by a method and mechanism as described herein. Broadly speaking, a multiprocessor computer system configured to selectively transmit address transactions using either a broadcast mode or a point-to-point mode is contemplated. Depending on the mode of transmission selected, either a directory-based coherency protocol or a broadcast snooping coherency protocol is implemented to maintain coherency within the system.

In one embodiment, a computing node is formed by a group of clients which share a common address and data network. Clients may include processing subsystems, memory subsystems, I/O bridges, or other devices. Generally speaking, memory subsystems coupled to the common address and data networks may be shared by other clients within the node. Further, processing subsystems may include caches for storing copies of the shared memory data. Clients initiating a coherence request transaction transmitted via the shared address network are unaware of whether the transaction will be conveyed within the node via a broadcast or a point-to-point mode transmission. Rather, the address network is configured to determine whether a particular transaction is to be conveyed in broadcast mode or point-to-point mode. In one embodiment, the address network includes a mode table with entries which are configurable to indicate transmission modes corresponding to different regions of the address space within the node. Upon receiving a coherence request transaction, the address network may then access the table in order to determine the transmission mode, broadcast or point-to-point, which corresponds to the received transaction.

In addition, it is contemplated that the above address network may adapt to conditions within the node by changing the transmission modes corresponding to received transactions. In one embodiment, network congestion may be monitored and transmission modes adjusted accordingly. For example, when network utilization is high, the number of transactions which are broadcast may be reduced. Alternatively, when network utilization is low, the number of broadcasts may be increased to take advantage of available bandwidth.

BRIEF DESCRIPTION OF THE DRAWINGS

Other objects and advantages of the invention will become apparent upon reading the following detailed description and upon reference to the accompanying drawings in which:

FIG. 4 is a diagram of a directory in a memory device.

Figure 1:
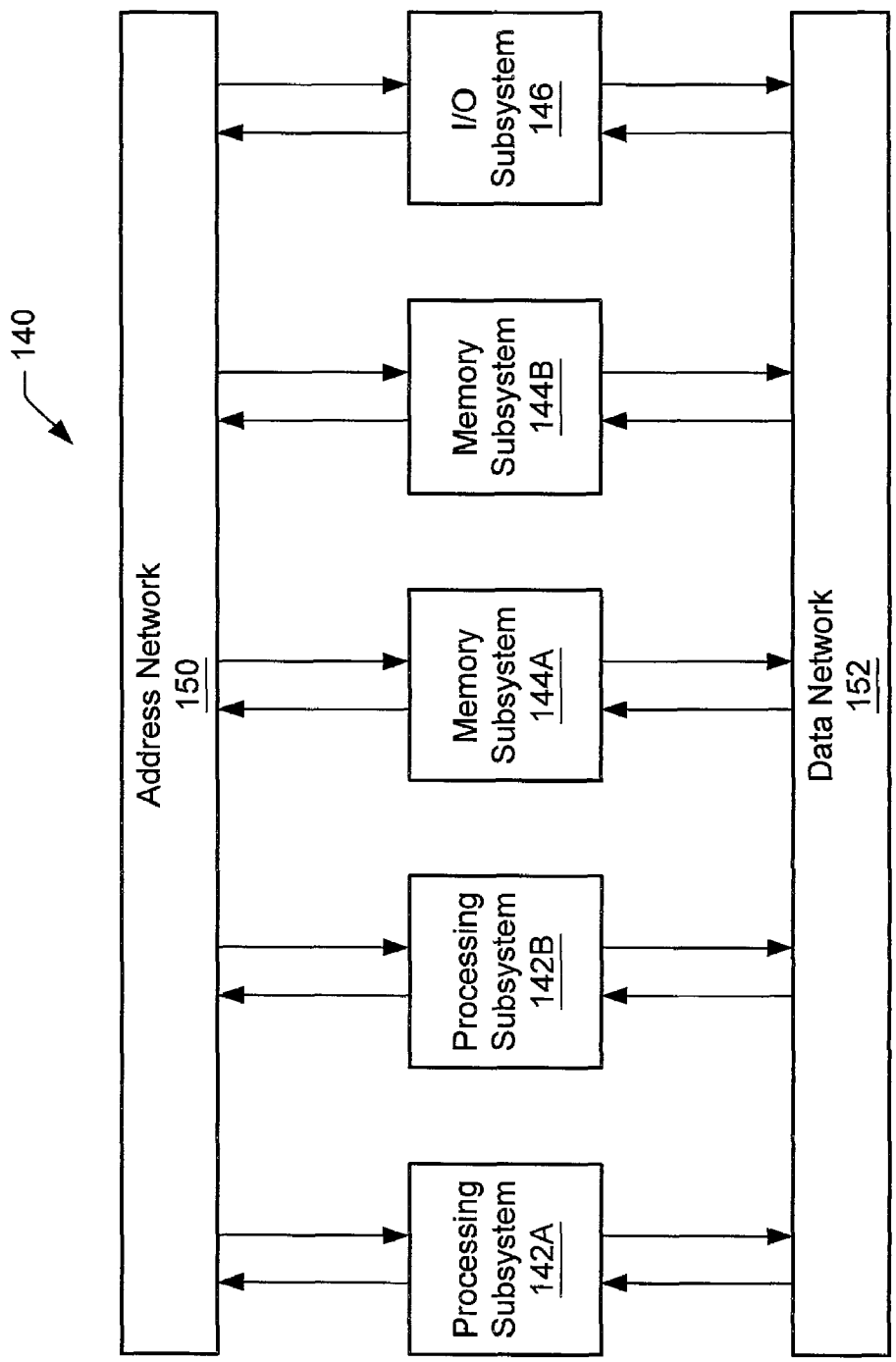
FIG. 1 is a block diagram of a multiprocessing node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Node Overview

FIG. 1 is a block diagram of one embodiment of a computer system 140 which is configured to maintain coherency by utilizing both broadcast and directory-based protocols. Computer system 140 includes processing subsystems 142A and 142B, memory subsystems 144A and 144B, and an I/O subsystem 146 interconnected through an address network 150 and a data network 152. Computer system 140 may be referred to as a "node". As used herein, the term "node" refers to a group of clients which share common address and data networks. In the embodiment of FIG. 1, each of processing subsystems 142, memory subsystems 144, and I/O subsystem 146 may be considered a client. It is noted that, although five clients are shown in FIG. 1, embodiments of computer system 140 employing any number of clients are contemplated. Elements referred to herein with a particular reference number followed by a letter will be collectively referred to by the reference number alone. For example, processing subsystems 142A–142B will be collectively referred to as processing subsystems 142.

Generally speaking, each of processing subsystems 142 and I/O subsystem 146 may access memory subsystems 144. Each client in FIG. 1 may be configured to convey address transactions on address network 150 and data on data network 152 using split-transaction packets. Typically, processing subsystems 142 include one or more instruction and data caches which may be configured in any of a variety of specific cache arrangements. For example, set-associative or direct-mapped configurations may be employed by the caches within processing subsystems 142. Because each of processing subsystems 142 within node 140 may access data in memory subsystems 144, potentially caching the data, coherency must be maintained between processing subsystems 142 and memory subsystems 144, as will be discussed further below.

Memory subsystems 144 are configured to store data and instruction code for use by processing subsystems 142 and I/O subsystem 146. Memory subsystems 144 preferably comprise dynamic random access memory (DRAM), although other types of memory may be used. Each address in the address space of node 140 may be assigned to a particular memory subsystem 144, referred to as the home subsystem of the address. Further, each memory subsystem 144 may include a directory suitable for implementing a directory-based coherency protocol. In one embodiment, each directory may be configured to track the states of memory locations assigned to that memory subsystem within node 140. For example, the directory of each memory subsystem 144 may include information indicating which client in node 140 currently owns a particular portion, or block, of memory and/or which clients may currently share a particular memory block. Additional details regarding suitable directory implementations will be discussed farther below.

In the embodiment shown, data network 152 is a point-to-point network. However, it is noted that in alternative embodiments other networks may be used. In a point-to-point network, individual connections exist between each client within the node 140. A particular client communicates directly with a second client via a dedicated link. To communicate with a third client, the particular client utilizes a different link than the one used to communicate with the second client.

Address network 150 accommodates communication between processing subsystems 142, memory subsystems 144, and I/O subsystem 146. Operations upon address network 150 may generally be referred to as address transactions. When a source or destination of an address transaction is a storage location within a memory subsystem 144, the source or destination is specified via an address conveyed with the transaction upon address network 150. Subsequently, data corresponding to the transaction on the address network 150 may be conveyed upon data network 152. Typical address transactions correspond to read or write operations. A read operation causes transfer of data from a source outside of the initiator to a destination within the initiator. Conversely, a write operation causes transfer of data from a source within the initiator to a destination outside of the initiator. In the computer system shown in FIG. 1, a read or write operation may include one or more transactions upon address network 150 and data network 152.

As will be described in further detail below, address network 150 is configured to selectively transmit coherence requests corresponding to read or write memory operations using either a broadcast mode transmission or a point-to-point mode transmission mode. For coherence requests which are conveyed point-to-point by address network 150, a directory-based coherency protocol is implemented. Conversely, when coherence requests are conveyed using a broadcast mode transmission, a snooping broadcast coherency protocol is implemented. Advantageously, node 140 may realize some of the benefits pertaining to both protocols.

In one embodiment, clients initiating a coherence request transmitted to address network 150 are unaware of whether the transaction will be conveyed within node 140 via a broadcast or a point-to-point mode transmission. In such an embodiment, address network 150 is configured to determine whether a particular transaction is to be conveyed in broadcast (BC) mode or point-to-point (PTP) mode. In the following discussion, an embodiment of address network 150 which includes a table for classifying transactions as either BC mode or PTP mode is described.

Hybrid Network Switch

Figure 2:
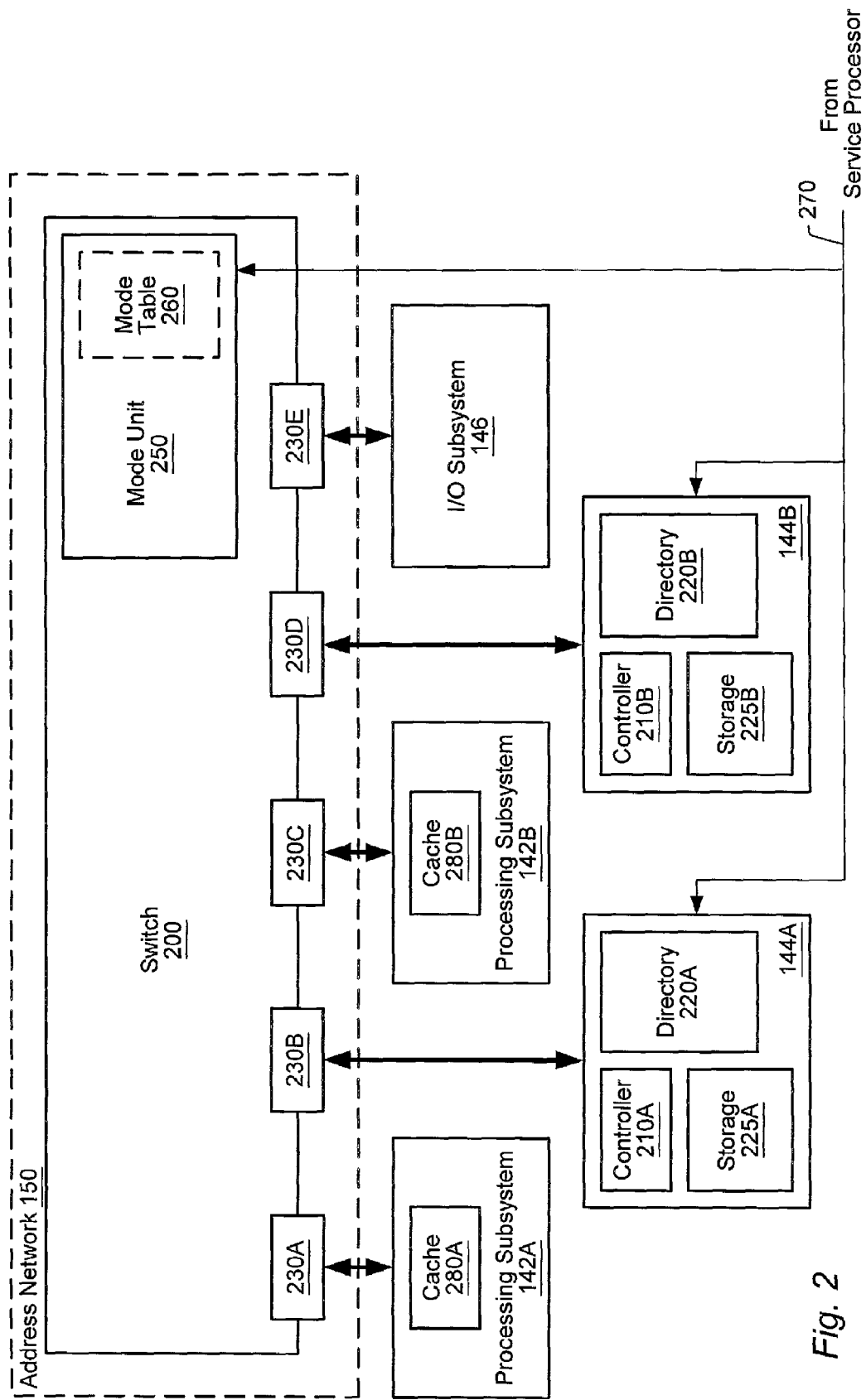
FIG. 2 is a diagram illustrating an address switch and memory devices.

FIG. 2 is a diagram illustrating a portion of one embodiment of node 140. Depicted in FIG. 2 are address network 150, memory subsystems 144, processing subsystems 142, and I/O subsystem 146. In the embodiment shown, address network 150 includes a switch 200 including a mode control unit 250 and ports 230A–230E. Mode unit 250 illustratively includes a mode table 260 configured to store an indication of a mode of conveyance, BC or PTP, for received coherency requests. Mode unit may comprise special task oriented circuitry (e.g., ASIC) or more general purpose processing circuitry executing software instructions. Processing units 142A–142B each include a cache 280 configured to store memory data. Memory subsystems 144A and 144B are coupled to switch 200 via ports 230B and 230D, respectively, and include controller circuitry 210, a directory 220, and storage 225. In the embodiment shown, ports 230 may comprise bi-directional links or multiple unidirectional links. Storage 225 may comprise RAM, or any other suitable storage device.

Also illustrated in FIG. 2 is a bus 270 coupled between a service processor (not shown), switch 200 and memory subsystems 144. The service processor may utilize bus 270 to configure and/or initialize switch 200 and memory subsystems 144, as will be described below. The service processor may be external to node 140 or may be a client included within node 140.

As previously described, address network 150 is configured to facilitate communication between clients within node 140. In the embodiment of FIG. 2, processing subsystems 142 may perform reads or writes which cause transactions to occur on address network 150. For example, a processing unit within processing subsystem 142A may perform a read to a memory location A which misses in cache 280A. In response to detecting the cache miss, processing subsystem 142A may convey a read request for location A to switch 200 via port 230A. Mode unit 250 detects the read request for location A and determines the transmission mode corresponding to the read request. In embodiments utilizing a mode table, the mode unit determines the transmission mode by consulting mode table 260. In one embodiment, the read request includes an address corresponding to location A which is used to index into an entry in mode table 260. The corresponding entry may include an indication of the home memory subsystem corresponding to location A and a mode of transmission corresponding to location A.

In the above example, location A may correspond to a memory location within storage 225A of memory subsystem 144A. Consequently, the entry in mode table 260 corresponding to the read request may indicate memory subsystem 144A is a home subsystem of location A. If the entry in mode table 260 further indicates that the address of the read request is designated for PTP mode transmissions, switch 200 is configured to convey a corresponding request only to memory subsystem 144A via port 230B (i.e., to the home subsystem). On the other hand, if the entry in mode table 260 indicates a BC transmission mode, switch 200 may be configured to broadcast a corresponding request to each client within node 140. Advantageously, switch 200 may be configured to utilize either PTP or BC modes as desired. Consequently, in this particular embodiment a single encoding for a transaction conveyed by an initiating device may correspond to either a BC mode or PTP mode transaction. The mode is determined not by the client initiating a transaction, but by the address network. The transmission mode associated with switch 200 may be set according to a variety of different criteria. For example, where it is known that a particular address space includes widely shared data, mode unit 250 may be configured to utilize BC mode transactions. Conversely, for data which is not widely shared, or data such as program code which is read only, mode unit 250 may be configured to utilize PTP mode. Further details regarding various other criteria for setting the mode of switch 200 will be described further below.

Transmission Mode Table

Figure 3:
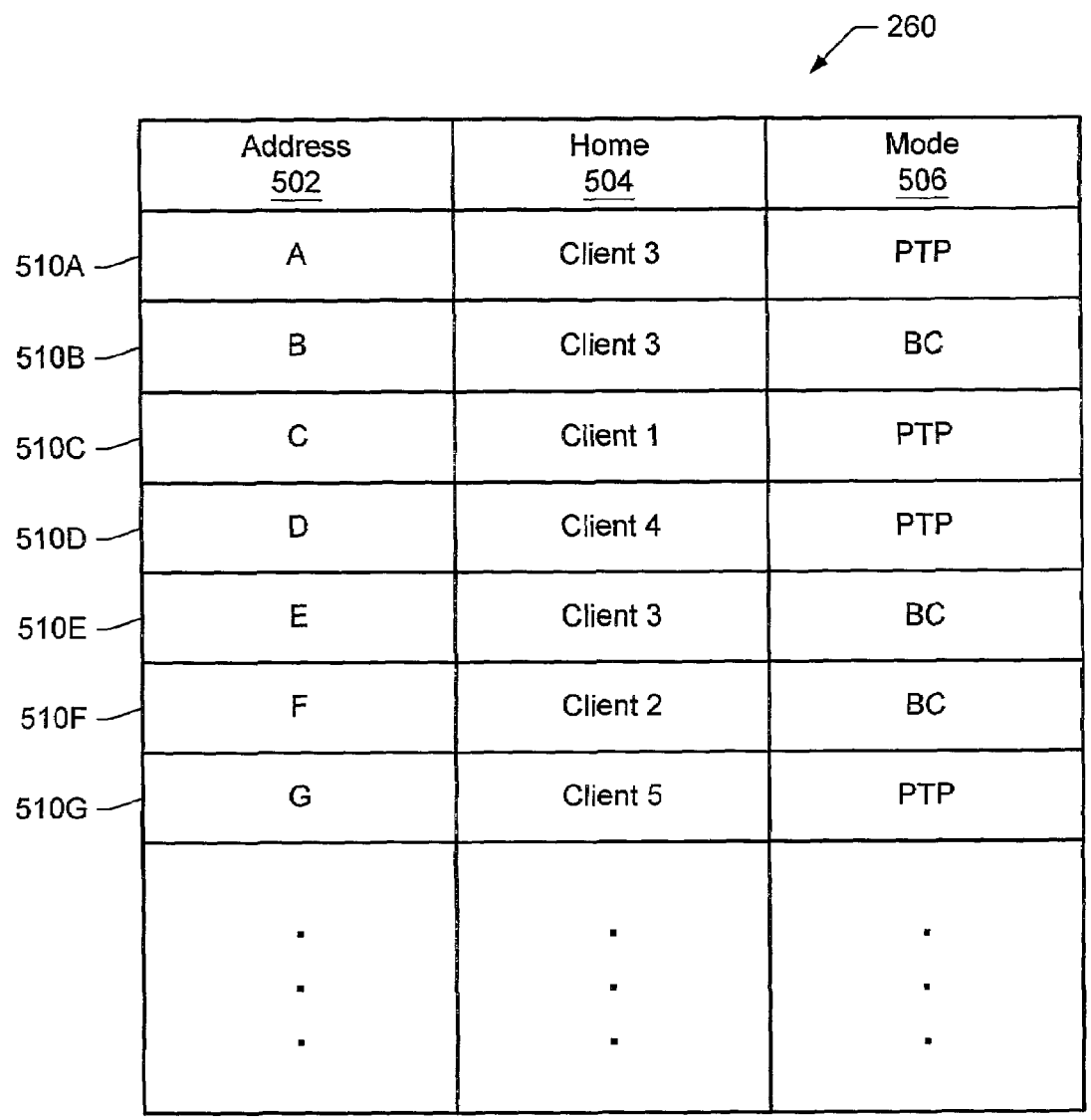
FIG. 3 is a diagram of a portion of a mode table in an address switch.

Turning to FIG. 3, one embodiment of a mode table 260 is shown. While the embodiment of FIG. 3 shows mode table 260 as being included within mode unit 250, mode table 260 may be external to mode unit 250. Mode table 260 may comprise a dynamic data structure maintained within a storage device, such as RAM or EEPROM. In the embodiment of FIG. 3, table 260 is depicted as including columns 502, 504 and 506, and rows 510. Each row 510 corresponds to a particular address space. For example, each row 510 may correspond to a particular page of memory, or any other portion of address space. In one embodiment, the address space corresponding to a node 140 is partitioned into regions called "frames". These frames may be equal or unequal in size. Address column 502 includes an indication of the frame corresponding to each row 510. Home column 504 includes an indication of a home subsystem corresponding to each row 510. Mode column 506 includes an indication of a transmission mode, BC or PTP, corresponding to each row 510 (and thus memory frame).

In the embodiment shown in FIG. 3, table 260 entries are directly mapped to a specific location. However, table 260 may be organized in an associative or other manner. Therefore, row 510A corresponds to entry A, row 510B corresponds to entry B, and so on. In a direct mapped implementation, table 260 need not actually include address column 502; however, it is illustrated for purposes of discussion. Each row 510 in the embodiment shown corresponds to an address space of equal size. As stated previously, table 260 may be initialized by a service processor coupled to switch 200.

As illustrated in FIG. 3, row 510A contains an entry corresponding to address region A 502. In one embodiment, mode unit 250 may utilize a certain number of bits of an address to index into table 260. For example, address "A" in row 510A may correspond to a certain number of most significant bits of an address space identifying a particular region. Row 510A indicates a home 504 subsystem corresponding to "A" is CLIENT 3. Further, row 510A indicates the mode 506 of transmission for transactions within the address space corresponding to region "A" is PTP. Row 510B corresponds to a region of address 502 space "B", has a home 504 subsystem of CLIENT 3, and a transmission mode 506 of BC. Each of the other rows 510 in table 260 includes similar information.

While the above description contemplates a mode unit 250 which includes a mode table 260 for determining a transmission mode corresponding to received transactions, other embodiments are possible as well. For example, mode unit 250 may be configured to select a transmission mode based on network traffic. In such an implementation, mode unit 250 may be configured to monitor link utilization and/or the state of input/output queues within switch 200. If mode unit 250 detects that network congestion is low, a transaction may be broadcast to take advantage of available bandwidth. On the other hand, if the mode unit 250 detects that network congestion is high, a transaction may be conveyed point-to-point in order to reduce congestion. Other embodiments may include tracking which address regions are widely shared and using broadcast transactions for those regions. If it is determined a particular address region is not widely shared or is read-only code, a point-to-point mode may be selected for conveying transactions for those regions. Alternatively, a service processor coupled to switch 200 may be utilized to monitor network conditions. In yet a further embodiment, the mode unit 250 may be configured such that all requests are serviced according to PTP mode transmissions or, alternatively, according to BC mode transmissions. For example, in scalable systems, implementations including large numbers of processors may be configured such that mode unit 250 causes all transactions to be serviced according to PTP mode transmissions, while implementations including relatively small numbers of processors may be set according to BC mode transmissions. These and other embodiments are contemplated.

As mentioned above, when switch 200 receives a coherence request, mode unit 250 utilizes the address corresponding to the received transaction as an index into table 260. In the embodiment shown, mode unit 250 may utilize a certain number of most significant bits to form the index which is used. The index is then used to select a particular row 510 of table 260. If the mode 506 indication within the selected row indicates PTP mode, a corresponding transaction is conveyed only to the home subsystem indicated by the home 504 entry within the row. Otherwise, if the mode 506 entry indicates BC mode, a corresponding transaction is broadcast to clients within the node. In alternative embodiments, different "domains" may be specified within a single node. As used herein, a domain is a group of clients that share a common physical address space. In a system where different domains exist, a transaction which is broadcast by switch 200 may be only broadcast to clients in the domain which corresponds to the received transaction. Still further, in an alternative embodiment, BC mode transactions may be broadcast only to clients capable of caching data and to the home memory subsystem. In this manner, certain transactions which may be unnecessary may be avoided while still implementing a broadcast snooping style coherence protocol.

Directories

As stated previously, for transactions which are conveyed in point-to-point mode by switch 200, a directory based coherence protocol is implemented. As shown in FIG. 2, each memory subsystem 144 includes a directory 220A which is used to implement a directory protocol. FIG. 4 illustrates one example of a directory 220A which may be maintained by a controller 210A within a memory subsystem 144A. Directory 220A includes an entry 620 for each memory block within storage 225A for which memory subsystem 144A is the home subsystem. In one embodiment, directory 220A maintains an entry 620 for each cache line whose home is memory subsystem 144A. In addition, directory 220A includes an entry for each client, 604–612, within node 140 which may have a copy of the corresponding cache line. Directory 220A also includes an entry 614 indicating the current owner of the corresponding cache line. Each entry in table 220A indicates the coherency state of the corresponding cache line in each client in the node. In the example of FIG. 4, a region of address space corresponding to a frame "A" may be allocated to memory subsystem 144A. Typically, the size of frame A may be significantly larger than a cache line. Consequently, table 220A may include several entries (I.e., Aa, Ab, Ac, etc.) which correspond to frame A.

It is noted that numerous alternative directory formats to support directory based coherency protocols are possible. For example, while the above description includes an entry 604–612 for each client within a node, an alternative embodiment may only include entries for groups of clients. For example, clients within a node may be grouped together or categorized according to a particular criteria. For example, certain clients may be grouped into one category for a particular purpose while others are grouped into another category. In such an embodiment, rather than including an indication for every client in a group, a directory within a memory subsystem 144 may only include an indication as to whether a group may have a copy of a particular memory block. If a request is received for a memory block at a memory subsystem 144 and the directory indicates a group "B" may have a copy of the memory block, a corresponding coherency transaction may be conveyed to all clients within group "B". Advantageously, by maintaining entries corresponding to groups of clients, directories 220 may be made smaller than if an entry were maintained for every client in a node.

Alternative embodiments of directories 220 are possible as well. In one embodiment, each directory 220 may be simplified to only include an indication that any one or more clients in a node may have a copy of a particular memory block.

By maintaining a directory as described above, appropriate coherency actions may be performed by a particular memory subsystem (e.g., invalidating shared copies, requesting transfer of modified copies, etc.) according to the information maintained by the directory. A controller 210 within a subsystem 144 is generally configured to perform actions necessary for maintaining coherency within a node according to a specific directory based coherence protocol. For example, upon receiving a request for a particular memory block at a memory subsystem 144, a controller 210 may determine from directory 220 that a particular client may have a copy of the requested data. The controller 210 may then convey a message to that particular client which indicates the memory block has been requested. The client may then respond with data if the memory block is modified, with an acknowledgement, or any other message that is appropriate to the implemented specific coherency protocol. In general, memory subsystems 144 need only maintain a directory and controller suitable for implementing a directory-based coherency protocol. As used herein, a directory based cache coherence protocol is any coherence protocol that maintains a directory containing information regarding cached copies of data, and in which coherence commands for servicing a particular coherence request are dependent upon the information contained in the directory.

In one embodiment, the well known MOSI cache coherency protocol may be utilized by memory subsystems 144. In such a protocol, a memory block may be in one of four states: Modified (M), Owned (O), Shared (S), and Invalid (I). The M state includes ownership and read/write access. The O state indicates ownership and read access. The shared state indicates no ownership and read access. Finally, the I state indicates no ownership and no access. However, many other well known coherency protocols are possible and are contemplated.

General Operations

Figure 5:
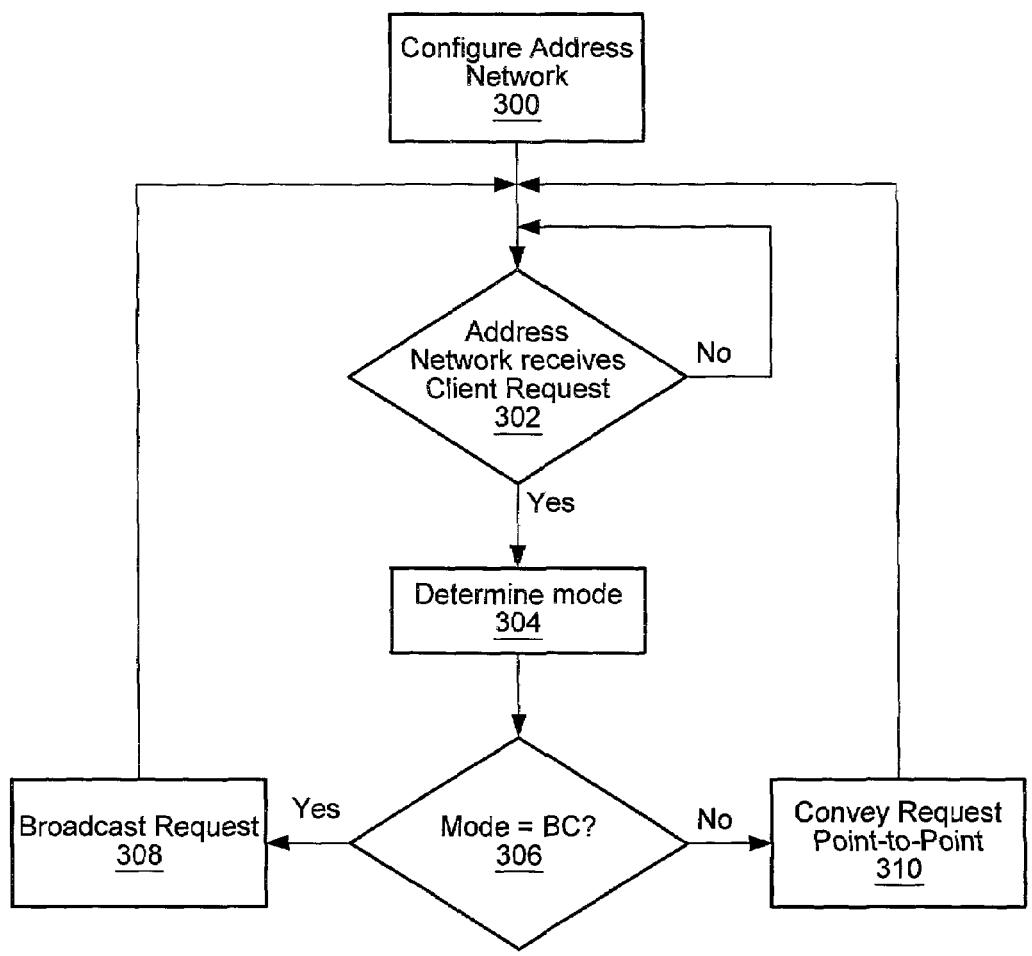
FIG. 5 is a flowchart illustrating a method of determining a mode of conveyance for a request.

Turning next to FIG. 5, one embodiment of a method for mixed mode determination and transmission is illustrated. An address network within a node is initially configured (block 300). Such configuration may include initializing a mode control unit and/or a mode table via a service processor. During system operation, if the address network receives a transaction request from a client (decision block 302), the address network determines the transmission mode (block 304) corresponding to the received request. In the above described embodiment, the mode control unit 250 makes this determination by accessing a mode table 260. If the mode corresponding to the request is determined to be BC mode (decision block 306), a corresponding request is broadcast to clients in the node. In contrast, if the mode corresponding to the request is determined to be PTP mode (decision block 306), a corresponding request is conveyed point-to-point to the home subsystem corresponding to the request (and not unconditionally) to other clients within the node.

During operation, it may be desirable to change the configuration of switch 200 to change the transmission mode for certain address frames (or for the entire node). For example, a mode unit 250 within switch 200 may be initially configured to classify a particular region of address space with a PTP mode. Subsequently, during system operation, it may be determined that the particular region of address space is widely shared and modified by different clients within the node. Consequently, significant latencies in accessing data within that region may be regularly encountered by clients. Thus, it may be desirable to change the transmission mode to broadcast for that region. While transmission mode configuration may be accomplished by user control via a service processor, a mechanism for changing modes dynamically may alternatively be employed.

As stated previously, numerous alternatives are contemplated for determining when the transmission mode of a transaction or corresponding region of address space may be changed. For example, in one embodiment an address switch or service processor may be configured to monitor network congestion. When the switch detects congestion is high, or some other condition is detected, the switch or service processor may be configured to change the modes of certain address regions from BC to PTP in order to reduce broadcasts. Similarly, if the switch or service processor detects network congestion is low or a particular condition is detected, the modes may be changed from PTP to BC.

Figure 6:
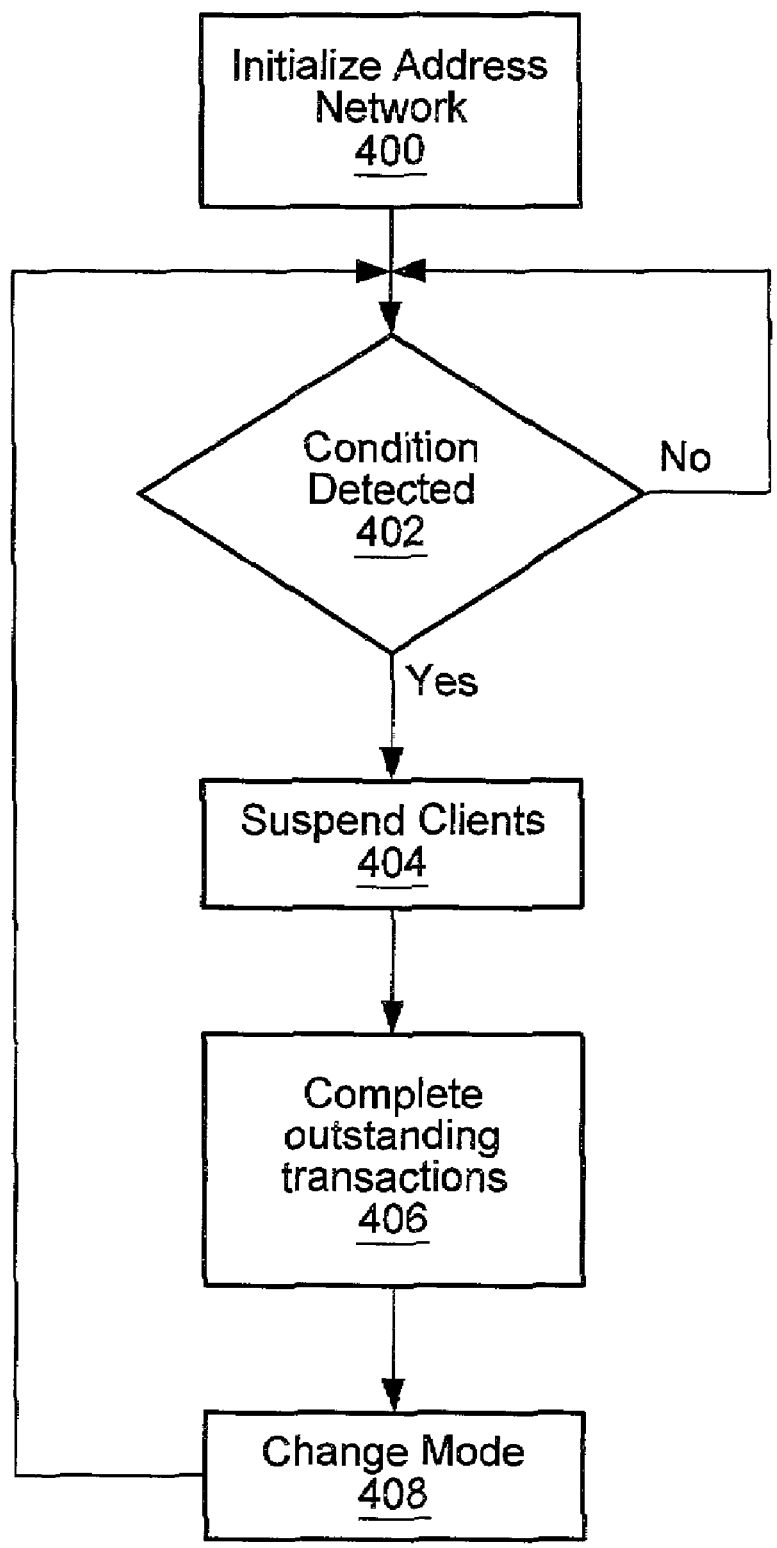
FIG. 6 is a flowchart illustrating a method for adapting a mode of conveyance.

FIG. 6 illustrates one embodiment of a method for dynamically changing transmission modes corresponding to transactions within an address network. An initial address network configuration (block 400) is performed which may include configuring a mode table 260 as described above or otherwise establishing a mode of transmission for transactions. During system operation, a change in the transmission mode of switch 200 may be desired in response to detection of a particular condition, as discussed above (decision block 402). In the embodiment shown, when the condition is detected (decision block 402), new client transactions are temporarily suspended (block 404), outstanding transactions within the node are allowed to complete (block 408), and the mode is changed (block 410). In one embodiment, changing the mode may comprise updating the entries of mode table 260 as described above. It is further noted that to accommodate transitions from broadcast mode to point-to-point mode, directory information (e.g., information which indicates an owning subsystem) may be maintained even for broadcast mode transactions.

Generally speaking, suspending clients (block 404) and allowing outstanding transactions within the node to complete (block 408) may be referred to as allowing the node to reach a quiescent state. A quiescent state may be defined as a state when all current traffic has reached its destination and there is no further traffic entering the node. Alternative embodiments may perform mode changes without requiring a node to reach a quiescent state. For example, rather than waiting for all transactions to complete, a mode change may be made upon completion of all pending address transactions (but while data transactions are still pending). Further, in embodiments which establish transmission modes on the basis of regions of memory, as in the discussion of frames above, a method may be such that only those current transactions which correspond to the frame whose mode is being changed need only complete. Various alternatives are possible and are contemplated.

Exemplary Processing Subsystem

Figure 7:
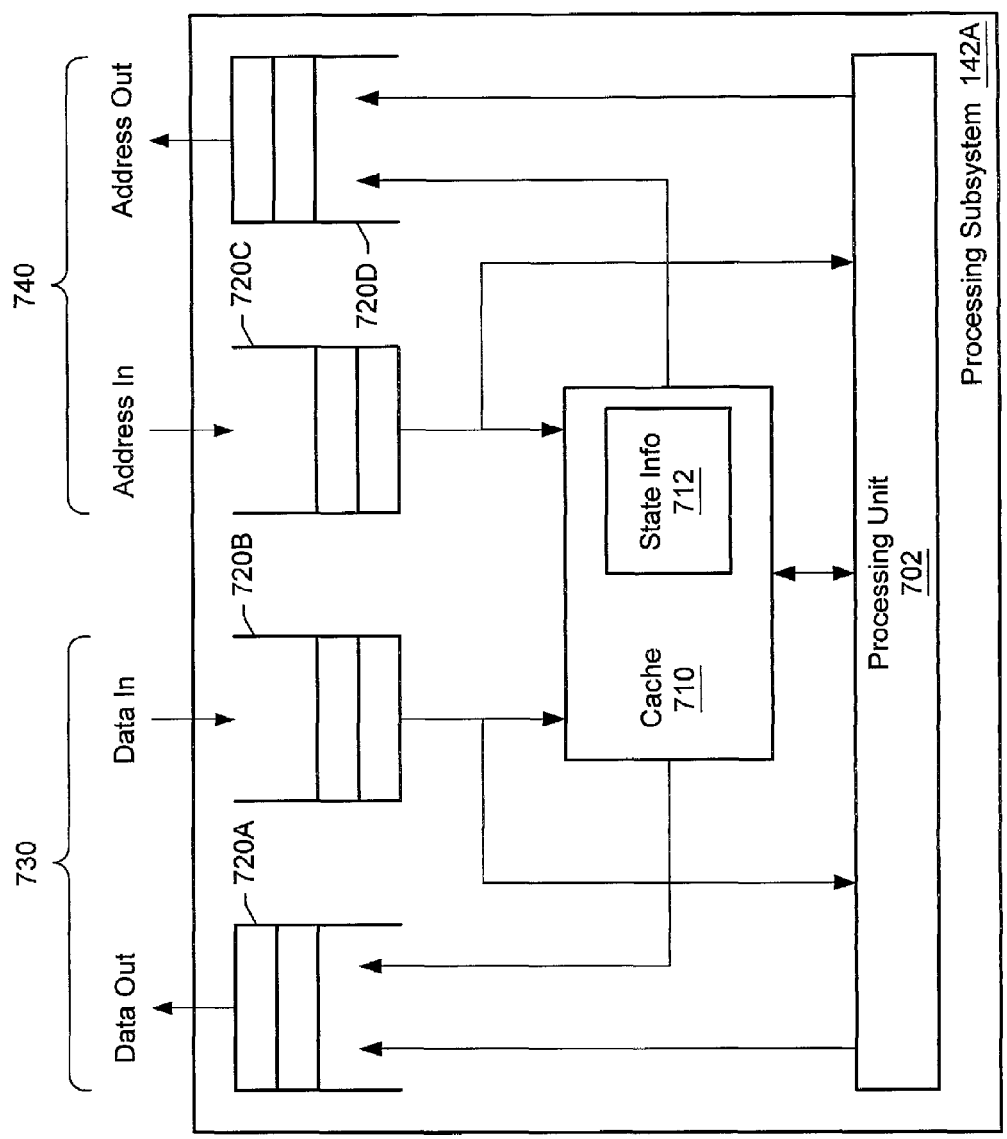
FIG. 7 is a block diagram of an active device in the system of FIG. 1.

FIG. 7 is a block diagram illustrating one embodiment of a processing subsystem 142A within a node 140. Included in the embodiment of FIG. 7 are a processing unit 702, cache 710, and queues 720. Queues 720A–720B are coupled to data network 152 via data links 730, and queues 720C–720D are coupled to address network 150 via address links 740. Processing unit 702 is coupled to cache 710.

In one embodiment, processing unit 702 is configured to execute instructions and perform operations on data stored in memory subsystems 144. Cache 710 may be configured to store copies of instructions and/or data retrieved from memory subsystems 144. In addition to storing copies of data and/or instructions, cache 710 also includes state information 712 indicating the coherency state of a particular memory block within cache 710. If processing unit 702 attempts to read or write to a particular memory block, and cache state info 712 indicates processing unit 702 does not have adequate access rights to perform the desired operation (e.g., the memory block is invalid in the cache 710), an address transaction comprising a coherency request may be inserted in address out queue 720D for conveyance to a home subsystem of the memory block. These coherency requests may be in the form of read-to-share and read-to-own requests. Subsequently, a valid copy of the corresponding memory block may be received via data in queue 720B.

In addition, processing subsystem 142A may receive coherency demands via address in queue 720C, such as a read-to-own or invalidate demand. If processing subsystem 142A receives a transaction corresponding to a read-to-own request for a memory block which is modified in cache 710, the corresponding memory block may be returned via data out queue 720A, and its state information 712 for that block may be changed to invalid. Alternatively, if processing subsystem 142A receives an invalidate demand for a memory block whose state is shared within cache 710, state information 712 may be changed to indicate the memory block is no longer valid within cache 710. Those skilled in the art will recognize there are numerous possible arrangements for caches 710, processing units 702, and interfaces 720.

Directory-Based Protocols

As stated previously, any of a variety of specific directory-based coherence protocols may be employed in the system generally discussed above to service PTP mode coherence requests. In the following discussion, a variety of scenarios are depicted illustrating coherency activity in a node utilizing one exemplary directory-based coherency protocol, although it is understood that other specific protocols may alternatively be employed.

Figure 8A:
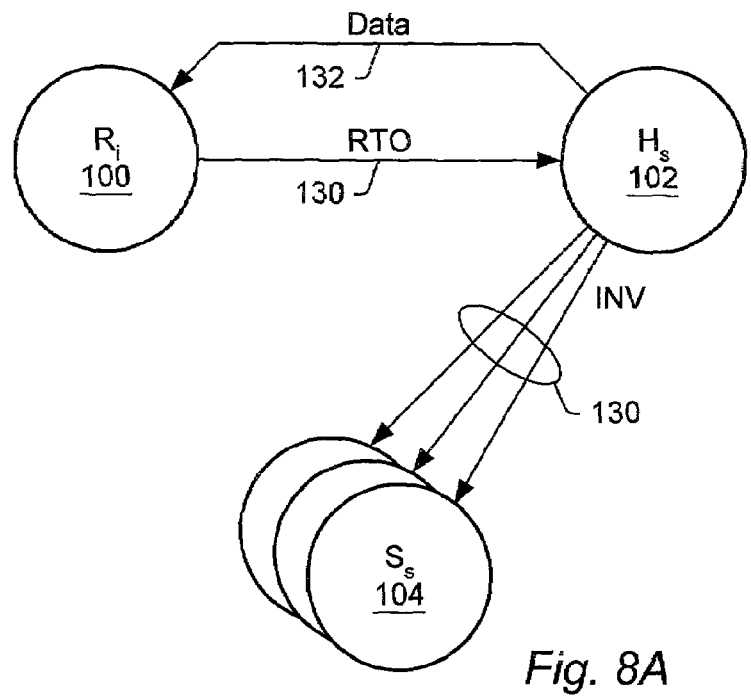
FIGS. 8A–8D are diagrams illustrating directory based coherence scenarios.

FIG. 8A is a diagram depicting coherency activity for an exemplary embodiment of node 140 in response to a read-to-own (RTO) transaction upon address network 140. A read to own transaction may be performed when a cache miss is detected for a particular datum requested by a processing subsystem 142 and the processing subsystem 142 requests write permission to the coherency unit. A store cache miss may generate a read to own transaction, for example.

A request agent 100, home agent 102, and several slave agents 104 are shown in FIG. 8A. In this context, an "agent" refers to a mechanism in a client configured to initiate and respond to coherency operations. Request agents and slave agents generally correspond to functionality within processing subsystems 142, while a home agent generally corresponds to functionality within a home memory subsystem.

In FIG. 8A, the requesting client 100 initiating a read to own transaction and has the corresponding coherency unit in an invalid state (e.g. the coherency unit is not stored in the client). The subscript "i" in request client 100 indicates the invalid state. The home client 102 stores the coherency unit in the shared state, and clients corresponding to several slave agents 104 store the coherency unit in the shared state as well. The subscript "s" in home agent 102 and slave agents 104 is indicative of the shared state at those clients. The read to own transaction generally causes transfer of the requested coherency unit to the requesting client. As used herein, a "coherency unit" is a number of contiguous bytes of memory which are treated as a unit for coherency purposes. For example, if one byte within the coherency unit is updated, the entire coherency unit is considered to be updated. In one specific embodiment, the coherency unit is a cache line.

Upon detecting a cache miss, request agent 100 transmits a read to own coherency request to the home client 102 (e.g., the home memory subsystem) of the coherency unit (reference number 130). The home agent 102 in the receiving home client detects the shared state for one or more other clients. Since the slave agents 104 are each in the shared state, not the owned state, the home client 102 may supply the requested data directly to the requesting client 100. Home agent 102 transmits a data coherency reply to request agent 100, including the data corresponding to the requested coherency unit (reference number 132). Home agent 102 updates its directory to indicate that the requesting client 100 is the owner of the coherency unit, and that each of the other clients is invalid. Home agent 102 transmits invalidate coherency demands to each of the slave agents 104 which are maintaining shared copies of the affected coherency unit (reference number 134). The invalidate coherency demand causes the receiving slave agent to invalidate the corresponding coherency unit within the slave client. In the example shown, the invalidate coherency demands are conveyed from a single point, home agent 102, to multiple points, slave agents 104. Consequently, the conveyance of the invalidation coherency demands may be considered a multicast. Subsequent to receiving the data coherency reply from home agent 102, request agent 100 validates the coherency unit within its local memory.

Figure 8B:
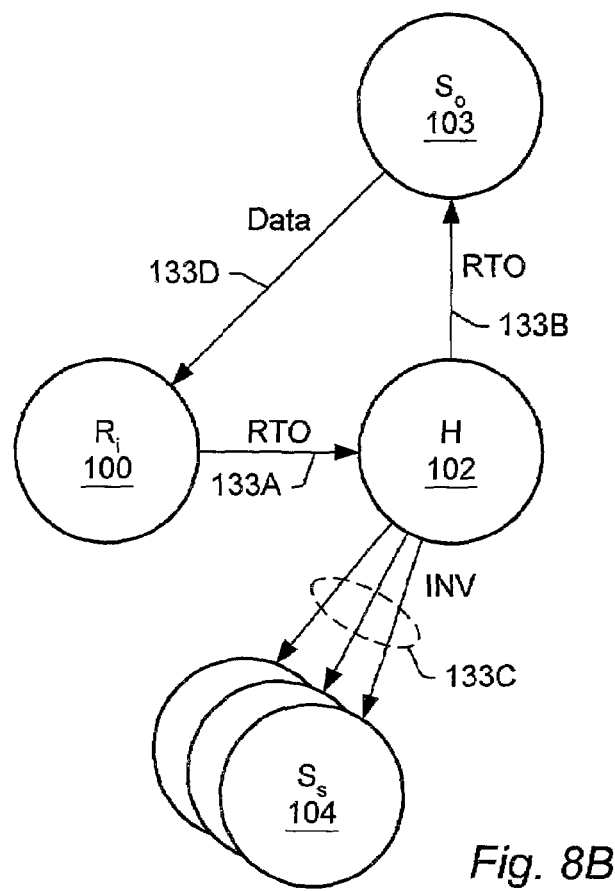

FIG. 8B is a diagram depicting coherency activity in response to a read-to-own request when a slave agent 103 is the current owner of the coherency unit and other slave agents 104 have shared copies of the coherency unit. The request agent 100 initiates the transaction by sending a read-to-own request to home agent 102 (reference number 133A). In one embodiment, this causes home agent 102 to block new transactions to this coherency unit. Home agent 102 marks the requestor 100 as the sole owner of the line and sends an RTO demand to the owning slave agent 103 (reference number 133B). Home agent also sends invalidate coherency demands to all other slave agents 104 with a shared copy (reference number 133C). The owning slave agent 103 replies with data to the requesting agent 100 (reference number 133D) and invalidates its copy.

Figure 8C:
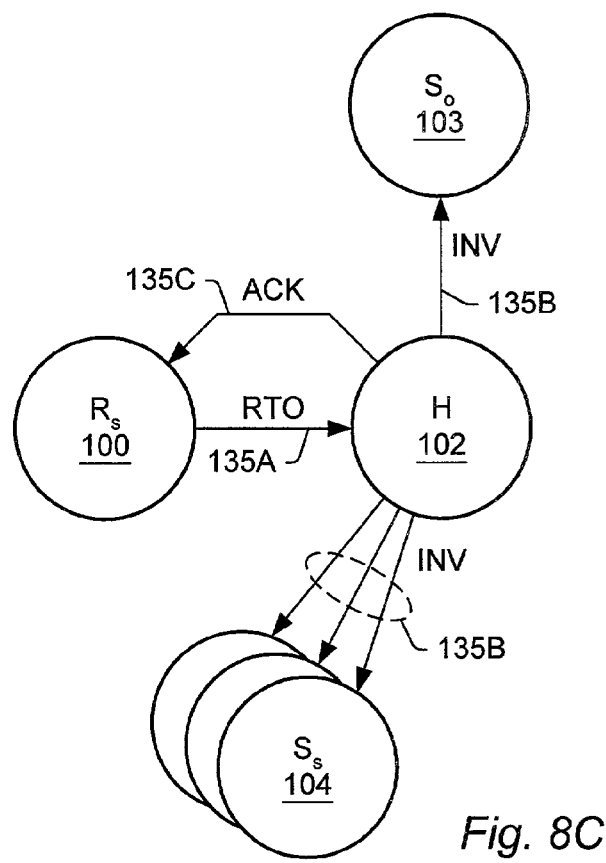

FIG. 8C illustrates a transaction wherein request agent 100 has a shared copy and sends a read-to-own request to home agent 102 (reference number 135A). When home agent 102 receives the read-to-own request, home agent 102 may block further transactions to this line. Home agent 102 further sends invalidation demands (reference number 135B) to all other clients with a copy of the line (not to the requester, however). Home agent 102 further marks request agent 100 as the sole owner. All slave agents (103 and 104) invalidate their copies. Finally, home agent 102 removes the block on transactions to that line and conveys an indication 135C to the request agent 100 that no other valid copies exist in the node.

Figure 8D:
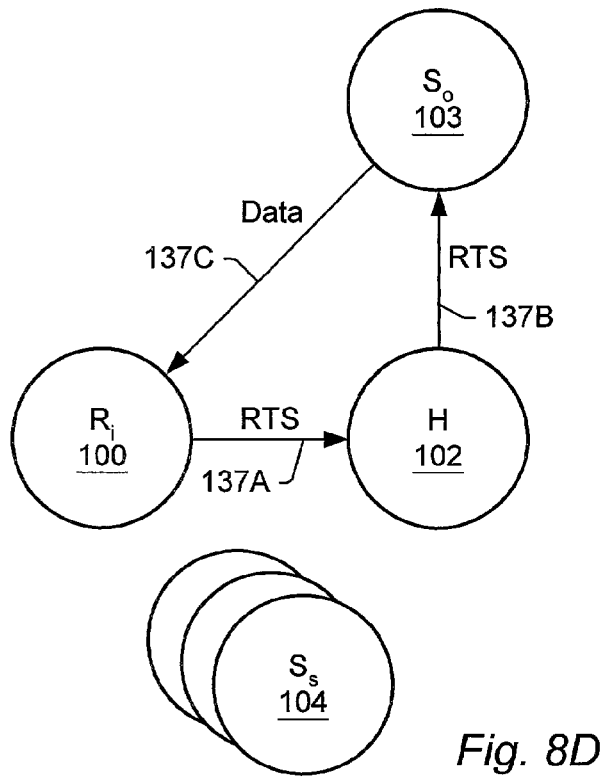

FIG. 8D depicts coherency activity in response to a read-to-share (RTS) request when a slave is the owner of the coherency unit. Similar to the above description, the coherency activity initiates when the request agent 100 sends a read-to-share request to the home agent 102 (reference number 137A). This causes home agent 102 to block new transactions to this line. Home agent 102 marks the requestor 100 as a sharer and sends a read-to-share demand to the owner slave agent 103 (reference number 137B). The owning slave agent 103 replies with data to the request agent 100 (reference number 137C) and remains in the owned state.

The above scenarios are intended to be exemplary only. Numerous alternatives for implementing a directory-based coherency protocol are possible and are contemplated. For example, in the scenario of FIG. 8A, the data coherency reply 132 from home agent 102 may serve to indicate no other valid copies remain within the client. In alternative embodiments, where ordering within the network is not sufficiently strong, various forms of acknowledgements (ACK) and other replies may be utilized to provide confirmation that other copies have been invalidated. For example, each slave agent 104 receiving an invalidate coherency demand may respond to the home agent 102 with an ACK. Upon receiving all expected ACKs, the home agent may then convey an indication to the request agent 100 that no other valid copies remain within the client. Alternatively, request agent may receive a reply count from home agent 102 or a slave agent 104 indicating a number of replies to expect. Slave agents 104 may then convey ACKs directly to the requesting client 100. Upon receiving the expected number or replies, the request agent 100 may then determine all other copies have been invalidated.

Virtual Networks and Ordering Points

In one embodiment, address network 150 comprises four virtual networks: a Broadcast Network, a Request Network, a Response Network, and a Multicast Network. Each virtual network may be configured to operate in logically different ways. For example, the Broadcast Network may implement a logical broadcast medium between client devices within a node and is only used for BC mode transactions. The Request Network may implement a logical point-to-point medium between client devices in a node and may only be used for PTP mode transactions. In one embodiment, coherence requests sent on the Request Network are sent to the device which maps the memory location corresponding to the transaction. The Response Network may also implement a logical point-to-point medium between client devices in a node and may only be used for PTP mode transactions. Packets sent on the Response Network may implement requests for data transfers. In one embodiment, packets sent on the Response Network are only sent to requesting and/or owning clients. Finally, the Multicast Network may implement a logical point-to-multipoint medium between client devices in a node and is used only for PTP mode transactions. In one embodiment, packets sent on the Multicast Network are sent to the requesting client and non-owning sharers.

Thus, in the embodiment of node 140 as discussed above, various ordering points are established within the node. These ordering points govern ownership and access right transitions. One such ordering point is the Broadcast Network. The Broadcast Network is the ordering point for cacheable BC mode transactions corresponding to a given memory block. All clients in a node or domain receive broadcast packets for a given memory block in the same order. For example, if clients C1 and C2 both receive broadcast packets B1 and B2, and C1 receives B1 before B2, then C2 also receives B1 before B2.

In other situations, a client may serve as an ordering point. More particularly, in the embodiment described above, for cacheable PTP mode address transactions, the order in which requests are serviced by the home memory subsystem directory establishes the order of the PTP mode transactions.

Multi-Node System

Figure 9:
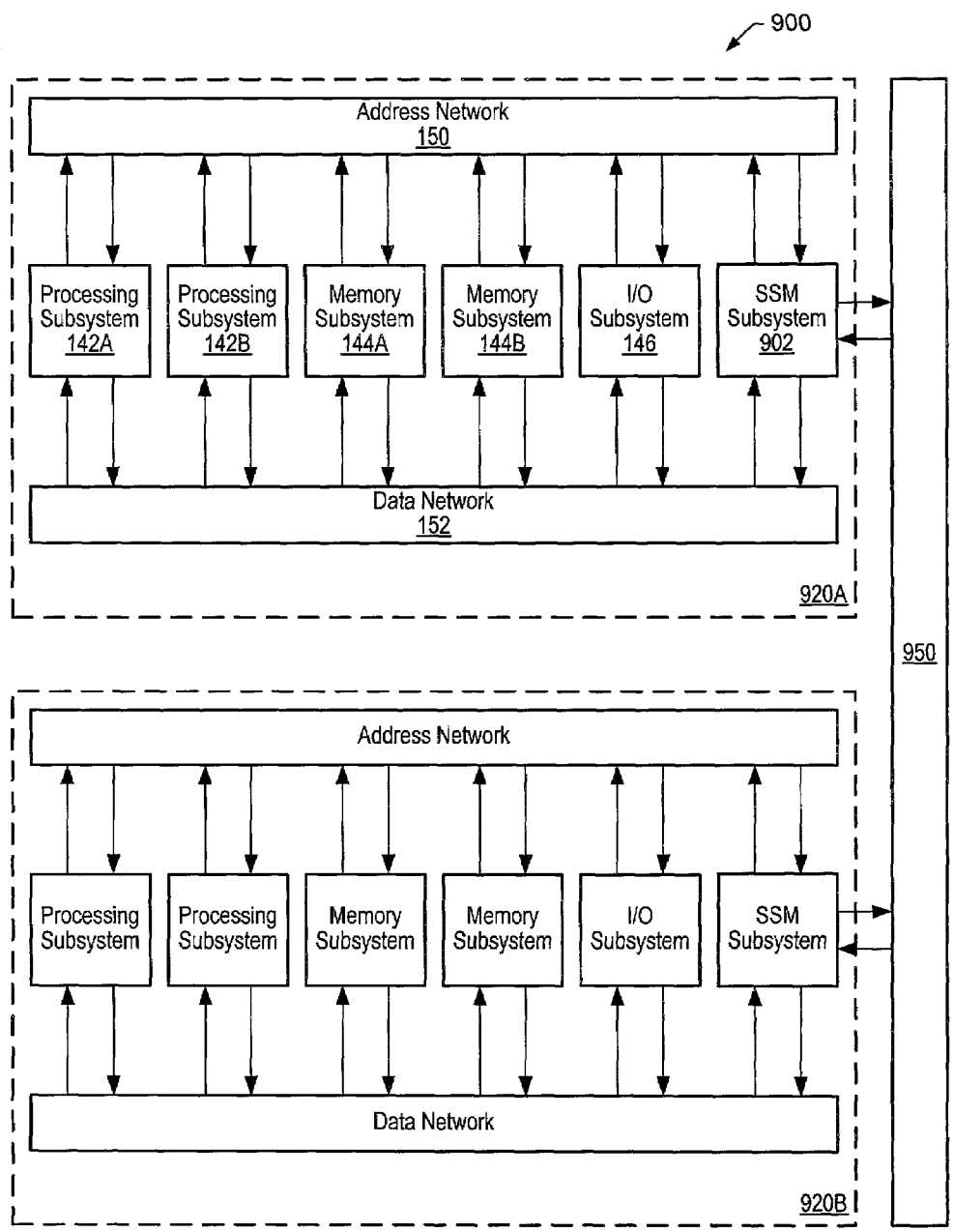
FIG. 9 is a block diagram of a multi-node computer system including the node of FIG. 1.

Turning now to FIG. 9, one embodiment of a multi-node computer system 900. Computer system 900 includes nodes 920A and 920B. Each of nodes 920 are similar to the node of FIG. 1. In addition to processing subsystems 142, memory subsystems 144, and I/O subsystem 146, each node 920 includes an scalable shared memory (SSM) subsystem 902. SSM subsystem 902 is coupled to address network 150 and data network 152. Further, SSM subsystems 902 are coupled to a global interconnect 950. In a multi-node computer system 900 as shown in FIG. 9, global interconnect serves as a communication medium between nodes 902. Consequently, data may not only be shared within a particular node 902A, but may also be shared between nodes 902 within a system 900. Generally, SSM subsystem 902 is configured to provide a communication interface between a node 902 and global interconnect 950.

Numerous variations and modifications will become apparent to those skilled in the art once the above disclosure is fully appreciated. It is intended that the following claims be interpreted to embrace all such variations and modifications.

What is claimed is:

1. A multiprocessing system comprising:
a plurality of clients;
wherein at least two of the plurality of clients comprise processing subsystems, each including a cache memory; and
wherein at least one of the plurality of clients comprises a memory subsystem including a directory; and
a network separate from said clients;
wherein said network includes a switch comprising a plurality of ports, wherein each of said plurality of clients may be coupled to a respective one of said plurality of ports, wherein the switch is configured to:
receive a first coherency request from a given client, wherein said first coherency request is not visible to any other of said plurality of clients; and
transmit a second coherency request in response to receiving said first coherency request;
wherein the switch further comprises a coherency mode storage unit configured to store an indication to control whether the switch will transmit said second coherency request according to a directory protocol or a broadcast protocol;
wherein if said second coherency request is transmitted by said switch according to said directory protocol:
said second coherency request is transmitted by said switch to only said client comprising said memory subsystem;
said directory is accessed by said memory subsystem; and
responsive coherency commands are provided to one or more of said plurality of processing subsystems dependent upon information contained within said directory.

2. The multiprocessing system as recited in claim 1, wherein said directory includes a plurality of entries corresponding to different memory locations mapped to said memory subsystem, wherein each entry contains information indicative of whether a cached copy of a corresponding block has been created in one or more of said plurality of processing subsystems.

3. The multiprocessing system as recited in claim 1, wherein said first coherency request:
is initiated and transmitted from a requesting processing subsystem through a point-to-point link; and
does not specify whether said second coherency request is transmitted by said switch according to said directory protocol or said broadcast protocol.

4. The multiprocessing system as recited in claim 1, wherein said coherency mode storage unit is configured to store a plurality of additional indications to control whether other coherency requests are transmitted by said switch according to said directory protocol or said broadcast protocol.

5. The multiprocessing system as recited in claim 4 wherein selected coherency requests are transmitted by said switch according to said directory protocol while other coherency requests are transmitted by said switch according to said broadcast protocol.

6. The multiprocessing system as recited in claim 5 wherein an address of the first coherency request is used to dictate whether the second coherency request is transmitted through said network according to said directory protocol or said broadcast protocol.

7. The multiprocessing system as recited in claim 1, wherein ownership transitions for a first set of cache lines are governed according to a sequence of actions within said network; and
wherein ownership transitions for a second set of cache lines are governed according to a sequence of actions within said directory.

8. The multiprocessing system as recited in claim 7, wherein said first coherency request is initiated by a requesting processing subsystem;
wherein said first coherency request is transmitted from said requesting processing subsystem through a point-to-point link; and
wherein said first coherency request does not specify whether said second coherency request is transmitted by said switch according to said directory protocol or said broadcast protocol.

9. The multiprocessing system as recited in claim 7 wherein if said second coherency request is transmitted by said switch according to said directory protocol, said second coherency request is transmitted by said switch to said memory subsystem, said directory is accessed by said memory subsystem, and responsive coherency commands are provided to one or more of said plurality of processing subsystems dependent upon information contained within said directory.

10. The multiprocessing system as recited in claim 7 wherein said coherency mode storage unit is configured to store a plurality of additional indications to control whether other coherency requests are transmitted by said switch according to said directory protocol or said broadcast protocol.

11. The multiprocessing system as recited in claim 10 wherein selected coherency requests are transmitted by said switch according to said directory protocol while other coherency requests are transmitted by said switch according to said broadcast protocol.

12. The multiprocessing system as recited in claim 11 wherein an address of the first coherency request is used to indicate whether the second coherency request is transmitted through said network according to said directory protocol or said broadcast protocol.

13. The multiprocessing system as recited in claim 1 wherein said directory includes a plurality of entries corresponding to different memory locations mapped to said memory subsystem, wherein each entry contains information indicative of whether a cached copy of a corresponding block has been created in one or more of said plurality of processing subsystems.

14. The multiprocessing system as recited in claim 1, wherein transitions of access rights for a first set of cache lines are governed according to a sequence of actions within said network; and
wherein transitions of access rights for a second set of cache lines are governed according to a sequence of actions within said directory.

15. A multiprocessing system comprising:
a plurality of clients;
wherein at least two of the plurality of clients comprise processing subsystems, each including a cache memory; and
wherein at least one of the plurality of clients comprises a memory subsystem including a directory; and
a network separate from said clients;
wherein said network includes a switch comprising a plurality of ports, wherein each of said plurality of clients may be coupled to a respective one of said plurality of ports, wherein the switch is configured to:
receive a first coherency request from a given client, wherein said first coherency request is not visible to any other of said plurality of clients; and
transmit a second coherency request in response to receiving said first coherency request;
wherein the switch further comprises a coherency mode storage unit configured to store an indication to control whether the switch will transmit said second coherency request according to a directory protocol or a broadcast protocol;
wherein said first coherency request corresponds to a first portion of a region of memory owned by a first client; and a third coherency request corresponds to a second portion of the region of memory owned by the first client;
wherein a first indication stored in the coherency mode storage unit corresponding to the first portion of the region of memory owned by the first client indicates that the switch will transmit the second coherency request according to a directory protocol; and
wherein a second indication stored in the coherency mode storage unit corresponding to the second portion of the region of memory owned by the first client indicates that the switch will transmit a fourth coherency request according to a broadcast protocol.

16. A multiprocessing system comprising:
a plurality of clients;
wherein at least one of the plurality of clients comprises a memory subsystem including a directory, the directory including a plurality of directory entries corresponding to memory locations mapped to said memory subsystem; and
wherein at least two of the plurality of clients comprise processing subsystems, each including a cache for storing blocks corresponding to selected ones of said memory locations; and
a network-separate from said clients, wherein the network comprises:
a switch comprising a plurality of ports, wherein each of said plurality of clients may be coupled to a respective one of said plurality of ports; and
a coherency mode storage unit configured to store an indication of whether a given block is a point-to-point mode block or a broadcast mode block;
wherein the switch is configured to route a coherency request for said given block initiated by one of said processing subsystems to said directory in response to said indication indicating said given block is a point-to-point mode block, and wherein said network is configured to broadcast said coherency request to said memory subsystem and to each of said plurality of processing subsystems in response to said indication indicating said given block is a broadcast mode block.

17. A switch comprising:
a plurality of ports, wherein each of said ports is configured to be coupled to one of a plurality of clients which are separate from said switch, wherein at least two of the plurality of clients comprise processing subsystems, each including a cache memory; and wherein at least one of the plurality of clients comprises a memory subsystem including a directory;

wherein the switch is configured to:
  receive a first coherency request from a given client, wherein said first coherency request is not visible to any other of said plurality of clients; and
  transmit a second coherency request in response to receiving said first coherency request;
wherein said first coherency request corresponds to a first portion of a region of memory owned by a first client; and a third coherency request corresponds to a second portion of the region of memory owned by the first client;
wherein a first indication stored in the coherency mode storage unit corresponding to the first portion of the region of memory owned by the first client indicates that the switch will transmit the second coherency request according to a directory protocol; and
wherein a second indication stored in the coherency mode storage unit corresponding to the second portion of the region of memory owned by the first client indicates that the switch will transmit a fourth coherency request according to a broadcast protocol.

18. The switch as recited in claim 17, further comprising a coherency mode storage unit configured to store an indication as to whether the switch will transmit said second coherency request according to a directory protocol or a broadcast protocol.

19. A multiprocessing system comprising:
a plurality of clients;
  wherein at least two of the plurality of clients comprise processing subsystems, each including a cache memory; and
  wherein at least one of the plurality of clients comprises a memory subsystem including a directory; and
a network separate from said clients;
  wherein said network includes a switch comprising a plurality of ports, wherein each of said plurality of clients may be coupled to a respective one of said plurality of ports, wherein the switch is configured to:
    receive a first coherency request from a given client, wherein said first coherency request is not visible to any other of said plurality of clients; and
    transmit a second coherency request in response to receiving said first coherency request;
  wherein the switch further comprises a coherency mode storage unit configured to store an indication to control whether the switch will transmit said second coherency request according to a directory protocol or a broadcast protocol;
  wherein ownership transitions for a first set of cache lines are governed according to a sequence of actions within said network; and
  wherein ownership transitions for a second set of cache lines are governed according to a sequence of actions within said directory;
  wherein if said second coherency request is transmitted by said switch according to said directory protocol, said second coherency request is transmitted by said switch to said memory subsystem, said directory is accessed by said memory subsystem, and responsive coherency commands are provided to one or more of said plurality of processing subsystems dependent upon information contained within said directory.

20. A multiprocessing system comprising:
a plurality of clients;
  wherein at least two of the plurality of clients comprise processing subsystems, each including a cache memory; and
  wherein at least one of the plurality of clients comprises a memory subsystem including a directory; and
a network separate from said clients;
  wherein said network includes a switch comprising a plurality of ports, wherein each of said plurality of clients may be coupled to a respective one of said plurality of ports, wherein the switch is configured to:
    receive a first coherency request from a given client, wherein said first coherency request is not visible to any other of said plurality of clients; and
    transmit a second coherency request in response to receiving said first coherency request;
  wherein the switch includes a control unit configured to monitor bandwidth utilization of said network and to control whether the second coherency request is transmitted through said network according to a directory protocol or a broadcast protocol depending upon the bandwidth utilization.

21. A method of operating a multiprocessing system including a plurality of clients, wherein at least two of the plurality of clients comprise processing subsystems and wherein at least one of the plurality of clients comprises a memory subsystem; and a network separate from said clients, wherein the network comprises a switch comprising a plurality of ports wherein each of said plurality of clients may be coupled to a respective one of said plurality of ports, the method comprising:
monitoring bandwidth utilization of said network;
storing an indication in said switch to control whether, in response to receiving a first coherency request, a second coherency request is transmitted through said network according to a directory protocol or a broadcast protocol;
receiving said first coherency request in said switch from a first processing subsystem, wherein said first coherency request is not visible to any other of said plurality of clients; and
said switch conveying said second coherency request according to said indication;
wherein said indication is set in dependence upon said bandwidth utilization.

* * * * *